D. S. WOLVERTON.
TRACTOR LUG.
APPLICATION FILED MAY 22, 1920.
1,392,100.
Patented Sept. 27, 1921.
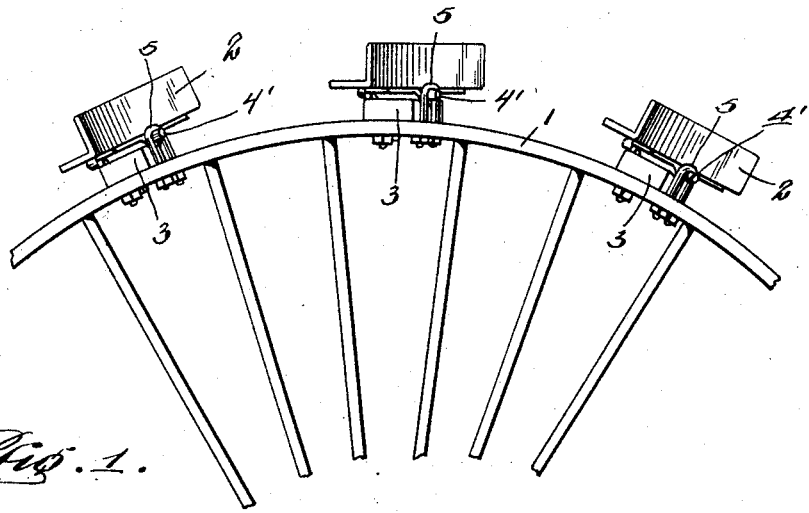
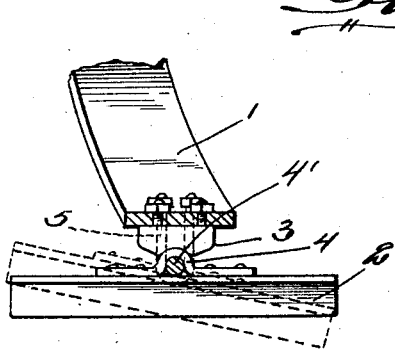
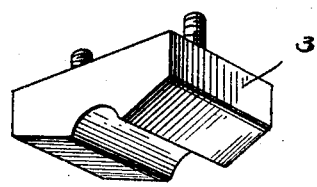
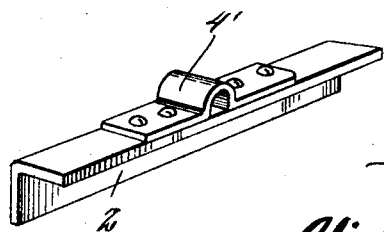
D. S. Wolverton.
INVENTOR
BY Victor J. Evans.
ATTORNEY
WITNESSES:

UNITED STATES PATENT OFFICE.

DON S. WOLVERTON, OF DOLAND, SOUTH DAKOTA.

TRACTOR-LUG.

1,392,100.  Specification of Letters Patent.  Patented Sept. 27, 1921.

Application filed May 22, 1920. Serial No. 383,470.

*To all whom it may concern:*

Be it known that I, DON S. WOLVERTON, a citizen of the United States, residing at Doland, in the county of Spink and State of South Dakota, have invented new and useful Improvements in Tractor-Lugs, of which the following is a specification.

This invention relates to mud mounts for tractor wheels and the principal object of the invention is to provide means whereby the lugs can have oscillatory movement on the wheel rim so as to facilitate the moving of the tractor over rough ground and to secure better traction on wet ground.

This invention also consists in certain other features of constrution and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a fragmentary view of a wheel supplied with my invention.

Fig. 2 is an enlarged view showing the means for securing the lug to the wheel rim.

Fig. 3 is a perspective view of one of the socket blocks.

Fig. 4 is a perspective view of one of the lugs.

In these views 1 indicates the rim of the wheel to which the lugs 2 are secured. These lugs are made of considerable length and are inclinedly arranged, as shown. The lugs are spaced apart so that they will not engage each other. Each lug is secured to the rim in the following manner: A block 3 is bolted to the rim, said block being provided with a semi-circular groove 4 in its outer face and said face sloping away from the groove, as shown in Fig. 3. Each lug 2 is provided with a semi-circular bearing $4^x$ which is seated in the groove 4 and a pin $4'$ passes through said bearing and is secured to the rim by the staples or U-shaped bolts 5.

It will thus be seen that the staples or U-shaped bolts and pin $4'$ hold the lug with its bearing in the groove 4 of block 3 so that said lug can oscillate on the rim. Thus the lugs will, upon striking the ground, assume a position conforming to the surface and so cause the tractor to travel more smoothly over rough ground. When working upon wet ground the lugs will provide better traction as the mud and dirt cannot accumulate between the lugs and their oscillatory movement will act to throw off the dirt and mud sticking to them.

What I claim is:—

1. In combination with a rim of a vehicle wheel, of a plurality of lugs arranged about said rim and means for securing said lugs to the rim for rocking movement including socketed members bolted to the rim and each lug being provided with a socket, a pin passed through the sockets for holding the lugs to the member and U-shaped bolts provided for holding the pin to the rim.

2. In combination with a rim of a vehicle wheel, a plurality of lugs arranged about said rim, blocks bolted to the rim and having semi-circular grooves formed therein, a semi-circular bearing provided on each lug and adapted to be seated in the grooves formed in the blocks, a pin passing through said bearing and secured to the rim.

In testimony whereof I affix my signature.

DON S. WOLVERTON.